Nov. 22, 1927.
R. MATTICE
1,650,144
METHOD OF REPAIRING CRACKED OR BROKEN STRUCTURES BY WELDING
Filed Oct. 28, 1926
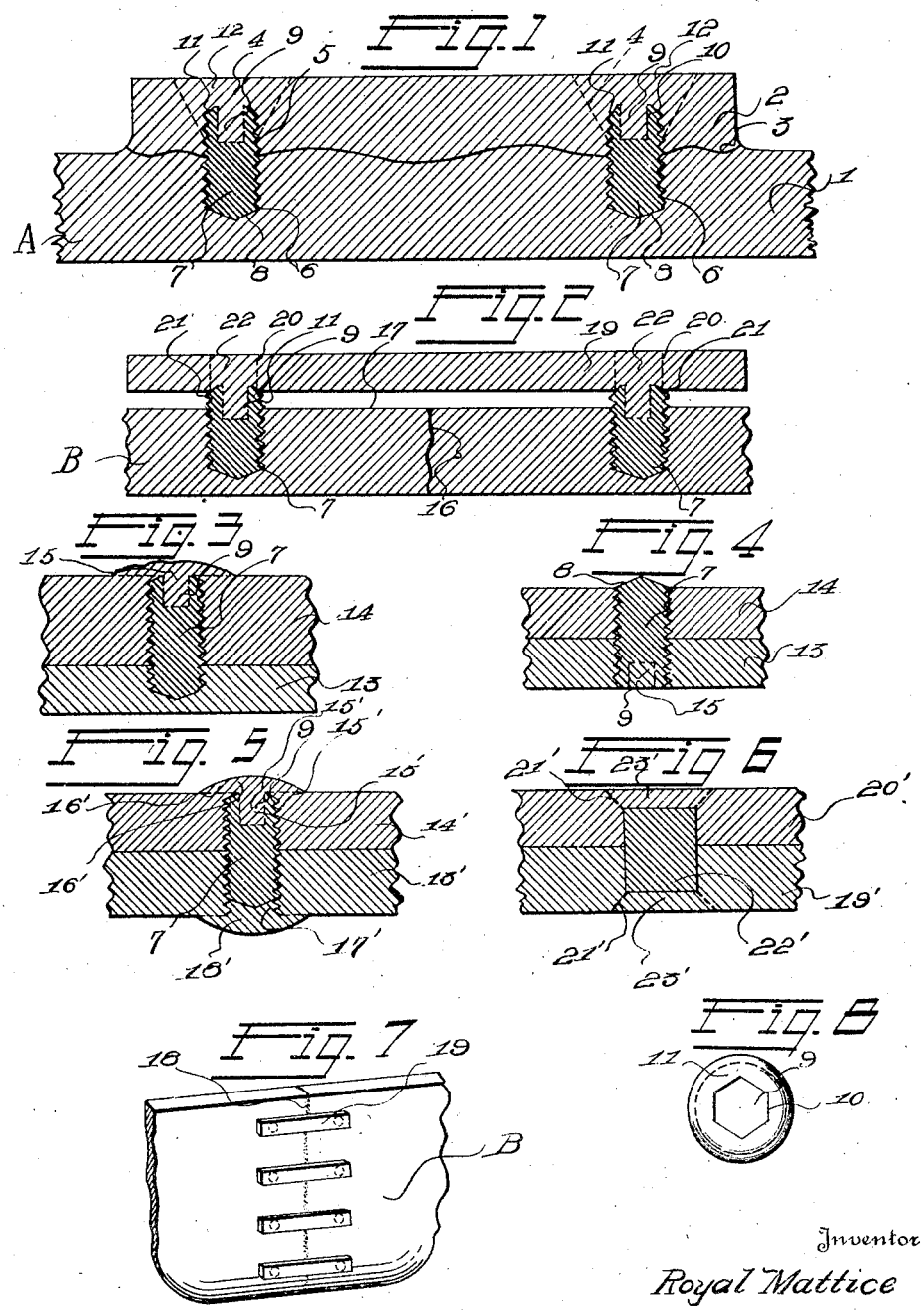
Inventor
Royal Mattice
By Donald U. Rich
Attorney Patented Nov. 22, 1927.

1,650,144

UNITED STATES PATENT OFFICE.

ROYAL MATTICE, OF BETHLEHEM, PENNSYLVANIA.

METHOD OF REPAIRING CRACKED OR BROKEN STRUCTURES BY WELDING.

Application filed October 28, 1926. Serial No. 144,861.

This invention relates to a method of repairing cracked, fractured or broken metallic structures by welding, and contemplates certain improvements in the method disclosed in my copending application, Ser. No. 737,318 filed September 12, 1924 and allowed June 14, 1926. The present invention also contemplates certain improvements on my own Patent No. 1,515,692 dated November 18, 1924 and the reissue thereof No. 16,274 of February 23, 1926.

It has been one method of repairing cracked, fractured or broken structures by forming a mechanical patch, bolts, cap screws or the like being employed, but this method presents many disadvantages in that an operator or a repair man would often twist the heads off of the cap screws, strip the bolt threads or break the bolt and sometimes the bolt would have a loose fit resulting in twisting thereof and precluding the tightening of the patch.

In my reissue patent, above mentioned, there is disclosed a method of repairing in which a substantially U-shaped member is secured at each end thereof to the article being repaired. The present invention, with particular reference to the improvements shown in the reissue patent, contemplates certain improvements in the method disclosed in said reissue patent and presents a method which is more simple and as effective in its results.

It has been found that in repairing certain cracked, fractured or broken articles, frequently insufficient space prohibited the use of bolts, cap screws or the like.

It is the primary object of the present invention to provide a method of repairing cracked, fractured or broken metallic structures in a quick and efficient manner.

It is a further object of this invention to obtain a shrink fit in the repair of cracked, fractured or broken metallic structures.

A still further object is to provide a method of welding together plates or other metallic articles whereby to repair the same.

Further objects and advantages of this invention will be apparent from the following description, taken in conjunction with the accompanying drawings, in which:

Figure 1 is a cross-sectional view through a repaired broken metallic structure.

Figure 2 is a cross-sectional view through a cracked metallic structure, showing the repair.

Figures 3 and 4 are fragmentary sectional views of repaired metallic structures, showing modified forms of the method.

Figure 5 is a sectional view of a repaired metallic structure showing a modified form of stud used in connection with the repair.

Figure 6 is a sectional view of a repaired metallic structure showing a modified form of the invention, with a modified form of stud.

Figure 7 is a fragmentary perspective view of a broken metallic structure, showing the same repaired in accordance with the present invention, and Figure 8 is a top plan view of the stud, used in the present invention.

Generally stated, the invention consists in providing a method of repairing metallic structures, which in use, are subjected to relatively high and rapid fluctuations in temperature or to extreme stresses or strains of all sorts, means being provided whereby the cracked or fractured portion of the structure is repaired in such a manner that the severe internal stresses of the metal adjacent the crack or fracture are transferred to a metallic member or bar disposed so as to bridge and span the crack or fracture. By "bridge" I mean so positioned that the major portion of the metallic member spans the crack or fracture in contradistinction to the arrangement shown in British patent to Jones 159,914 of 1921, in which patent the member used in repair, in reality, forms an integral part of the repaired structure. It has been found that in use the method disclosed in said British patent is unsatisfactory for the reason that the metal in and adjacent the weld is subjected to very high stresses which cannot be taken care of by the method of repair shown in said British patent.

Referring more particularly to the drawings, in which similar characters of reference designate similar parts in the several views, A (see Figure 1) designates a piece of metal of any structure which has had a portion thereof broken, the two sections being designated as 1 and 2, while 3 indicates the line of break, which in the instance shown is of irregular contour.

As the first step in the present method of repairing the broken structure A, provided the sections 1 and 2 are complementary, I first drill or otherwise form a number of openings 4 in the section 2 which openings are then countersunk as shown at 5. The countersinks extend down almost to the lower edge of the section 2, as clearly shown in said Figure 1. In practice, the countersinks usually extend to a depth of about ¼ of an inch less than the thickness of section 2 at the portion being drilled. This depth has been found satisfactory, but the depth of the countersink may vary in accordance with the particular "job" and I do not limit this invention to any specific depth of countersink.

When the openings 4 have been formed and countersunk, the section 2 is placed in position against the section 1 and held thereagainst in any suitable manner, whereupon openings 6 are drilled in the section 1, which openings are aligned with the openings 4; section 2 serving as a master plate.

The openings 6 are then tapped or threaded, the template being removed if necessary, and then studs 7 are secured within said openings. The studs are, in reality, self-secured to the section 1 and due to the preceding steps which have been before mentioned, it will be apparent that the studs are aligned each with the other and with the openings 4 in section 2. The studs are secured directly to the plate 1 and, as before mentioned, are self-secured. This is in contradistinction to the disclosure in British patent to The Quasi-Arc Company No. 114,268 of 1918, with which I am familiar, and in which patent the studs are secured to the plate by means of welding material, the studs thus not being self-secured to the plate but being indirectly secured by means of welding material. In other words, the studs of the present invention are mechanically and directly secured to the section 1 in contradistinction to the indirect and non-mechanically secured position shown in the British patent. The studs 7 are substantially cylindrical in shape and may be provided with a tapered lower end 8. The studs 7 are provided with a recess in one end thereof, as shown at 9, and said recess 9 extends within the body of the stud a substantial distance. The type of recess is more clearly shown in Figure 7 and it will be seen that the recess is defined by a plurality of angular sides 10, forming in effect, a polygonal recess and in the practice of this invention, the studs are inserted within the recesses 6 by means of a suitable wrench or tool which engages within the recesses. The upper edge of the studs is inclined from the outer edge thereof toward the recesses as clearly shown in Figure 1, thus providing a tapered seat 11, the purpose of which will be hereafter described. With the studs inserted in the section 1 as shown in Figure 1, the section 2 is then placed in position as shown also in said Figure 1 and the countersunk openings filled with welding material, as shown at 12, and it is to be noted that the welding material completely fills the countersink and also the recesses 9 in each stud forming, in effect, a welded head on each stud 7. It will be apparent that by the use of a stud which is provided with a recessed end, the stud may be easily inserted in a seat in the section 1, and when said recess is filled with welding material, a far greater binding of the section 2 with the section 1 is obtained for the reason that the welding material not only encircles the end of the stud but also fills the recess 9 therein and forms a unitary structure comprising the section 2, the welding material and the stud, the latter both on the outside thereof and within the recess therein.

Inasmuch as section 2 and the stud 7 are both heated during the welding, upon cooling, the section 2 contracts and a shrink fit thereof to the section 1 is obtained. Following the welding, any surplus metal at the weld may be removed in any suitable manner to finish off the surface adjacent the weld.

The method shown in Figure 3 which discloses a modified form of the invention is particularly adaptable for welding structures in which a water-tight weld or connection is necessary, and 13 and 14 designate overlapping sections of a structure which it is desired to render water-tight and said structures are provided with a tapped opening in which is seated the stud 7, the upper edge thereof being approximately in line with the upper edge of section 14. With the stud 7 in position, as shown in Figure 3, the recess 9 therein is filled with welding material 15 which is permitted to overlap on the upper edge of the section 14. The welding results in an expansion of the stud and tightens the latter in its threaded position in both sections 13 and 14 thus resulting in a very tight and leak-proof connection. As shown in Figure 4, it is not altogether necessary to form an overlapped weld on the upper surface of 14, nor is it altogether necessary to seat the stud within the section 13, and as shown in said Figure 4 an opening may be formed entirely through the sections 13 and 14 and the stud 7 secured therein by being threaded to each section 13 and 14. In this figure it will be noted that the tapered end 8 is shown as positioned beyond the edge of section 14 but obviously the stud may be positioned with the tapered end unexposed. When the welding material 15 is placed in the recess 9 the stud is heated and the latter expands, thus tightening the connection of the stud with the sections 13 and 14.

Referring now to Figure 2, B designates a section of a cracked article, the crack therein being designated as 16. This cracked article, it will be noted, differs from the article shown in Figure 1 in which latter a portion of the article A is broken off completely while in Figure 2 the crack appears in the article and some means must be provided for bracing or reinforcing the article, when repaired. It has been found highly desirable and in fact necessary that the crack 16 be bridged by a member which will take up and transfer the strains from one side of the crack to the other. In this Figure 2, the studs 7 are threadedly engaged within the surface B with the ends thereof extended beyond the face 17 of said structure. Studs are secured on each side of the crack 16, as shown clearly in Figure 7, and the crack 16 may be filled with welding material 18, if desired. In the repair of a cracked structure, such as shown in Figure 2, a bridging element 19 is used which is provided with openings 20 extending therethrough and which align with the studs 7. The openings 20 are slightly less in diameter than the diameter of the studs in order that the edges 21 adjacent the openings may seat on the inclined upper edge 11 of the studs in order to space the bridging element 19 from the structure B. The figure discloses the bridging element as substantially spaced from the structure B but this is for illustrative purposes only and it is to be understood that the bridging element 19 may so connect with the studs 7 that the bridging element is just adjacent the face 17 of the structure B in order that the bridging element 19 may span the crack or fracture 16. With the bridging element 19 in the position just described, the openings 20 and the recesses 9 in the studs are filled with welding material 22 thus rigidly connecting the bridging element 19 with the studs 7 at the places of weld and forming a bridging connection of the bridging element 19 with the structure B.

Figure 5 discloses a modified form of repair which is particularly adaptable when it is desired to obtain a joint which is both water, gas and oil tight and it will be noted that 13' and 14' designate overlapping sections of a structure. In the method shown in this figure an opening is provided entirely through the sections 13' and 14', the openings being aligned as shown in said figure and then tapped or threaded. A stud, indicated at 7 which is the same type of stud shown in Figures 1, 2 and 3 is positioned and threaded within the aligned openings in the sections 13' and 14', with both ends thereof within the outer edges of said sections 13' and 14'. The stud 7 is provided with the opening 9 and said opening is filled with welding material 15' with a portion thereof forming a head 16'. The opposite end of the stud 7, as before mentioned, is positioned within the outer edge of the section 13' and provides a recess which is filled with welding material 17', the welding material overlapping the recess forming a head 18'.

Figure 6 shows a slightly different form of the invention in which a piece of shafting or other suitable material is used to effect a repair. In this figure 19' and 20' indicate overlapping sections of a structure to be repaired, and aligned openings are formed through the two sections, which openings are countersunk as shown at 21'. 22' indicates a piece of shafting or other suitable material, which is of such diameter that the same may be inserted in the aligned openings with a resulting tight fit and the ends of such element 22' spaced from the edges of the sections 19' and 20'. The countersunk portions 21' are then filled with welding material 23' with a resultant shrink fit and a satisfactory and durable repair thus effected. It has been stated that 19' and 20' indicate overlapping portions, but it is to be understood that the invention is not restricted to overlapping sections but obviously the same repair might be effected on any superposed plates without departing from the spirit of the invention.

This invention has been practiced by electric welding, for the reason that electric welding may be accurately controlled and a complete, nice and durable repair may be readily effected.

It has been found that by using a bridging element 19 formed of ductile weldable material, highly satisfactory results are obtained but I do not limit myself to a plate of this character, as obviously, a non-ductile plate may be employed within the spirit and scope of the invention.

It is believed that the invention will be fully apparent to those skilled in the art but I desire it understood that the disclosure herein is for illustrative purposes only and that various changes may be made within the scope of the appended claims without departing from the spirit of the invention.

Having thus described my invention, what I claim as new and desire to secure by Letters Patent is:

1. The method of repairing cracked or broken structures which comprises securing hollow ended studs in said structure, said structure providing the holding means for said studs, superposing a perforated plate on said structure, with the hollow ends of the studs extending into the perforations, and then filling the said perforations and the hollow ends of the studs with welding material to form a head on each of said studs to unite the superposed plate therewith.

2. The method of repairing cracked or broken structures which comprises securing hollow ended studs in said structure, said structure providing the holding means for said studs, superposing a perforated plate on said structure to bridge the crack or break, with the hollow ends of the studs extending into the perforations, and then filling the said perforations and the hollow ends of the studs with welding material to form a head on each of said studs to unite the superposed plate therewith.

3. The method of joining metal plates or the like which comprises forming countersunk perforations in one of said plates, mechanically securing hollow ended studs to the other plate, said studs being aligned with the aforesaid perforations, superposing the perforated plate on the other plate with the hollow ends of the studs extended into the perforations, and then welding the studs to the superposed plate to fill the countersinks and the hollow ends of the studs, whereby to form a welded head on each of said studs.

4. The method of joining metal plates or the like which comprises forming perforations in one of said plates, securing hollow ended projecting studs in the other plate, said plate providing the holding means for said studs whereby said studs are positively aligned with each other and with the perforations in said first mentioned plate, then superposing the perforated plate on said second named plate with the hollow ends of the studs extending into the perforations therein, and finally welding the studs to the perforated plate to fill the countersinks and the hollow ends of the studs.

5. The method of repairing cracked metallic structures which consists in sealing the crack, forming a plurality of perforations in a plate, forming a plurality of recesses in the cracked structure which align with the perforations in said plate, securing hollow ended studs directly to the cracked structure in the recesses therein said recesses corresponding in size with the studs whereby the latter are aligned with each other and with the aforesaid perforations, superposing the plate on the cracked structure with the hollow ends of the studs extending into the perforations, and finally electrically welding the studs to said plate to fill the countersinks and the hollow ends of the studs.

6. The method of repairing cracked metallic structures which comprises mechanically securing hollow ended studs to said structure on each side of the crack, superposing a perforated bridging element on the hollow ends of said studs, and then welding the studs to the bridging element to fill the hollow ends and the perforations in said bridging element.

7. A metallic joint comprising studs mechanically secured to the metal on each side of said joint and a bridging element spaced from the metal and welded to said studs.

8. The method of repairing cracked metallic structures which comprises mechanically securing hollow ended studs to said structure on each side of the crack, superposing a perforated bridging element on the hollow ends of said studs, said studs extending through the perforations, and then welding the bridging element to the studs, filling the hollow ends thereof.

In testimony whereof I hereunto affix my signature.

ROYAL MATTICE.